US006306320B1

(12) United States Patent
Flautt et al.

(10) Patent No.: US 6,306,320 B1
(45) Date of Patent: Oct. 23, 2001

(54) METHOD OF INCREASING THE STRENGTH AND FATIGUE RESISTANCE OF FIBER REINFORCED COMPOSITES

(75) Inventors: Martin Charles Flautt, Granville; Byron Jeffrey Hulls, Reynoldsburg; David George Miller, Pickerington, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/364,218

(22) Filed: Jul. 29, 1999

(51) Int. Cl.$^7$ .................................................. B29C 44/06
(52) U.S. Cl. ...................... 264/45.3; 156/172; 156/173; 264/54; 264/136; 264/137
(58) Field of Search ................................ 264/45.1, 45.3, 264/136, 137, 54; 156/172, 173

(56) References Cited

U.S. PATENT DOCUMENTS

| 3,610,420 | * | 10/1971 | Sampson et al. ..................... 210/490 |
| 3,742,985 |   | 7/1973  | Rubenstein . |
| 3,876,495 | * | 4/1975  | Esler ....................................... 264/54 |
| 4,120,923 |   | 10/1978 | Kloker et al. . |
| 4,129,634 | * | 12/1978 | Cecka et al. ......................... 264/45.3 |
| 4,264,655 |   | 4/1981  | Brook . |
| 4,369,894 |   | 1/1983  | Grover et al. . |
| 4,410,481 | * | 10/1983 | Mayerhoffer ........................ 264/45.3 |
| 4,413,822 |   | 11/1983 | Fernandez et al. . |
| 4,486,474 |   | 12/1984 | Hampshire . |
| 4,611,980 | * | 9/1986  | Tsuji et al. ........................... 264/310 |
| 4,808,963 |   | 2/1989  | Stunzi et al. . |
| 5,055,119 |   | 10/1991 | Flautt et al. . |
| 5,245,813 |   | 9/1993  | Brotz . |
| 5,319,003 |   | 6/1994  | Gomez et al. . |
| 5,368,794 | * | 11/1994 | Ou ....................................... 264/45.3 |
| 5,474,721 | * | 12/1995 | Stevens ............................... 264/46.9 |
| 5,529,731 | * | 6/1996  | Bendick et al. ...................... 264/257 |
| 5,811,051 | * | 9/1998  | Kikuchi et al. ...................... 264/409 |
| 5,935,508 | * | 8/1999  | Fernyhough et al. ............... 264/495 |

FOREIGN PATENT DOCUMENTS 704315    2/1965    (CA) .

OTHER PUBLICATIONS

R.J. Kerans, et al., The Role of the Fiber–Maxtrix Interface in Ceramic Composites, Ceram. Bull. 68 (2): 429–442 (1989).
H.C. Cao et al., Effect of Interfaces on the Properties of Fiber–Reinforced Ceramics, J.Am. Ceram. Soc. 73: 1691–1699 (1990).
A.G. Evans et al., The Role of Interfaces in Fiber–Reinforced Brittle Matrix Composites, Composites Sci. & Tech. 42 (1991).

* cited by examiner

*Primary Examiner*—Allan R. Kuhns
(74) *Attorney, Agent, or Firm*—Inger H. Eckert

(57) ABSTRACT

A method of increasing the amount of entrained vapor in fiber-reinforced resin composite materials, and in particular filament wound composites, wherein a particularly effective chemical foaming or blowing agent is incorporated into the resin matrix composition used to form the composites. The foaming agent creates vapor-filled voids throughout the resin matrix of the composite as it cures. The superior composites containing these vapor-filled voids demonstrate high burst strength retention and excellent resistance to cyclic fatigue. The invention also relates to composite materials and articles thereof.

10 Claims, No Drawings

METHOD OF INCREASING THE STRENGTH AND FATIGUE RESISTANCE OF FIBER REINFORCED COMPOSITES

This application is related to application Ser. No. 09/364,219, which is being concurrently filed herewith and which is incorporated herein by reference in its entirety.

TECHNICAL FIELD AND INDUSTRIAL APPLICABILITY OF THE INVENTION

This application relates to a means of increasing the amount of entrained vapor in fiber-reinforced composite materials. Specifically, the present invention relates to a method of increasing the amount of entrained vapor in composite products formed during filament winding operations, these products having high resistance to cyclic fatigue and excellent strength retention. The invention accomplishes these effects by incorporating a chemical foaming or blowing agent into the resin matrix composition used to form the composites. When the resin matrix composition is cured, vapor-filled voids are formed which improve the strength and resistance of the composite products. Also described are composite materials containing such resin compositions, and articles made from the composites.

BACKGROUND OF THE INVENTION

Fiber reinforced composites have become widely recognized over the last fifty years for their usefulness as load-bearing materials having excellent thermal and impact resistance, high tensile strength, good chemical resistance and insulating properties. The term "composite" broadly applies to any combination of individual materials, usually built up in layers. The materials may include, for example, cementitious compositions, ceramics or synthetic materials such as plastic resins.

Generally, in fiber-reinforced plastic composites, fibers, typically of glass or carbon, are impregnated within a resin matrix to create a strengthened material. The resulting material has physical properties that are superior to the individual characteristics of the fibers or the resins. Thus, although the fibers are fragile in nature and susceptible to handling damage, and the resin may be soft and overly pliable, when the fibers are incorporated into the resinous matrix, the material so formed has improved strength and durability. The glass fibers strengthen and stiffen the matrix for load bearing, while the matrix resin binds the fibers together and spreads the load across them, thereby protecting them from impact and environmental deterioration. By selecting the matrix, fiber and manufacturing process, the composites can be tailored to meet desired performance requirements. For example, filament wound composites are made using continuous fibers that conform to a desired shape. To make these composites, one or more multi-filament glass strands or rovings are passed through a bath of resin, then the resin-coated strand is wound onto a mandrel of the desired shape. The shaped article is then cured to solidify the resin.

A variety of polymer matrix resins have been used to design and fabricate fiber-reinforced composites. Generally, these resins may be classified into two categories: thermosetting and thermoplastic resins. The difference between these resins and their selection for making the composites is based on their chemistry. The choice of either thermosetting or thermoplastic resins affects the processing conditions and the final form of the composite material. Both types of resin are comprised of molecular chains, however thermoplastics are processed at high temperatures and maintain their plasticity, enabling them to be reheated and re-shaped more than once. Common thermoplastic resins include polyalphaolefins, nylon, polycarbonate and polyvinyl chloride (PVC). The molecular chains in thermoset resins cross-link during the resin curing process, which is effected using heat and/or a catalyst, and as a result the resin sets into a rigid state. Examples of these resins include polyesters, vinyl esters, phenolics, polybutadienes, polyurethanes, polyimides and epoxies.

While thermosetting resins are preferred in some filament-wound composites because of their good mechanical, electrical and chemical-resistance properties, their ease of handling and their relatively low cost, some deficiencies have however been discovered to be associated with their use in this type of composite. For example, researchers have identified certain failure modes that relate to infrastructure uses of the composites. K. Liao et al., *Environmental Durability of Fiber-Reinforced Composites for Infrastructural Applications*, Proceedings of the Fourth ITI Bridge NDE Users Group Conference (1995). These failure modes include moisture absorption which leads to chemical breakdown of the polymer; creep resulting in rupture; physical aging, in which the polymer approaches equilibrium below its glass transition temperature; stress corrosion; weathering and fatigue.

Filament wound composites such as pipes are typically subjected to cyclic periods of intense pressure during their use life. Over time, this repeated exposure to periods of high internal pressure causes fatigue. Fatigue results in fracture, matrix cracking or splitting, or fiber-matrix debonding once the fatigue limit of the composite is exceeded. In manufacturing filament wound composites, then, it is necessary to design a composite that will withstand at least the maximum pressure that the composite will encounter during normal use. Typically in the industry, such composites are designed to withstand at least 5 times the rated maximum use pressure intended for the article being manufactured. Therefore, where the article is, for example, a pipe with a rated use pressure of 3,000 psi (pounds per square inch), the pipe is manufactured and tested to ensure that it can initially withstand exposure to pressures of at least 15,000 psi. To test the product, a length of the pipe may be filled with fluid, then repeatedly pressurized at its rated use pressure until signs of fatigue such as cracks, leakage or bursting are observed.

Efforts have been made to improve the strength of the composites and so improve burst strength retention and resistance to fatigue. For example, the amount and type of the components may be changed. However, while modifying the type and amount of the components can be used to affect the final properties of the composites, traditionally there have been limitations to doing so. Increasing the amount of fiber component will provide more rigidity, but if the proportion of fibers to polymer is too high the composite becomes too brittle. Conversely, when the amount of polymer in relation to the fiber component is high, the polymer may be more easily molded, but the strength properties are decreased.

Additionally, it has long been recognized that fiber-reinforced composites are extremely sensitive to the bonding strength between the fiber and the matrix. R. J. Kerans, *The Role of the Fiber-Matrix Interface in Ceramic Composites*, Ceram. Bull. 68 (2): 429–442 (1989); H. C. Cao et al., *Effect Of Interfaces on the Properties of Fiber-Reinforced Ceramics*, J. Am. Ceram. Soc. 73:1691 (1990); A. G. Evans et al., *The Role Of Interfaces in Fiber-Reinforced Brittle Matrix Composites*, Composites Sci. & Tech. 42:3–24

(1991). This recognition has led to significant efforts to modify the interface between the fiber and polymer, and so improve the product strength. Accordingly, improving the compatibility of the sizing on the surface of coated glass fibers with the matrix resin has often been investigated as a means of improving the physical performance characteristics of the composites. Traditionally in the art, this compatibility has been evaluated by measuring the clarity of the composite, as well as the absence of air bubbles within the matrix. In particular, while certain types of reinforced composites such as foamed composites have been designed to incorporate a volume of air or vapor into the composite matrix to expand the resin and provide some durability, the procedure of incorporating air into filament wound composites was not previously contemplated. Rather, up until the time of the present invention, using a foaming agent or other additive to permit vapor entrainment and volume expansion in wound composites has been considered undesirable.

Moreover, dispersion of the fibers and coating of their surfaces by the matrix resin has a significant impact on the properties of the composites. Consequently, many efforts have been made to improve the compatibility of the fibers and matrix resins, and thereby to improve the dispersion and coating of the fibers. This is particularly important in filament winding operations where the composite is formed by passing a multi-filament glass strand or roving through a bath of resin and then winding the resin-coated strand onto a mandrel to form the composite article upon cure of the resin. In such operations, enhancing the ability of the resin to impregnate the strand and surround the fiber has been thought to impart improved physical properties to the resulting composites. Typically, this has been attempted by development of the improved sizing compositions applied to the fibers, in addition to mechanically spreading the fibers in the strand as they pass through the resin bath. However, despite significant advances in the properties obtained in such products by these developments, a need continues for ways to obtain further improvements in these composites. Such a need is met by the products and processes of the invention described herein.

SUMMARY OF THE INVENTION

It has now been discovered that incorporating an effective amount of a foaming or vapor-entraining agent into the matrix resin composition used to make a fiber reinforced composite provides a product of high fatigue resistance and excellent strength retention. Accordingly, the present invention relates to a method of increasing the amount of entrained vapor during the manufacture of a fiber-reinforced composite, comprising:

a) dispersing an effective amount of a blowing or foaming agent into the matrix resin composition used to form fiber-reinforced resin composite;

b) contacting the composition with a multi-filament, fibrous reinforcing material;

c) shaping the resin coated fibers; and d) curing the matrix resin to form a composite.

The foaming agent is added in an amount sufficient to increase the volume of entrained vapor within the composite by a range of from about 2% to about 11%, based on the total volume of the composite formulation. This additive enhances the composition by reducing the specific density upon activation and increasing the durability of the composites that are formed. The resulting resin compositions have utility in the manufacture of composite materials by numerous processes, and in particular, in filament-winding operations.

In another aspect, the present invention further includes a method of making a resin composition including combining the foaming agent according to the previous embodiment, a thermosetting resin, and a particulate resin material dispersed within this resin.

In yet another embodiment, the invention includes fiber-reinforced composite materials comprising the aforementioned resin compositions, and further including one or more fiber reinforcing materials known in the art of making reinforcing composites. Lastly, the inventive concept extends to articles manufactured with the novel composite materials, and which, as a consequence, possess desirable properties.

DETAILED DESCRIPTION OF THE PREFERRED EMBODIMENTS OF THE INVENTION

The invention provides an improvement in the quality and performance of fiber-reinforced composite materials that traditionally had not incorporated a foaming agent, such as the category of filament wound composites. According to the invention, improved durability is achieved by adding an appropriate amount of a highly effective foaming or vapor-generating agent to the matrix resin material used to form the composites.

In one aspect, the invention comprises a process of forming filament wound composites in which a small amount of blowing or foaming agent (hereinafter collectively referred to as the foaming agent) is added to the matrix resin composition used to form the composite matrix. The foaming agent may be selected from gases such as air, carbon dioxide, helium, argon, nitrogen, volatile hydrocarbons such as propane or butane, and halogenated hydrocarbons, and mixtures thereof, which may be incorporated into the polymer resin matrix to provide the desired expansion. Alternatively, a chemical foaming agent that reacts to produce a gas or vapor may preferably be used.

The chemical foaming agent decomposes as a result of a chemical reaction when it is activated, usually by heating. When heated beyond its activation temperature, the foaming agent breaks down and produces a vapor or gaseous decomposition product, which forms pore-like spaces in the resinous matrix. The amount of this ingredient is sufficient to create a relatively small volume expansion without creating an excessively foamed product, since a high level of foaming would prevent the composition from being used in the desired composite-making applications, such as filament winding. While the exact mechanism by which the foaming agent improves the durability of the composites, including the filament wound composites, is not completely understood, it is believed that the voids it creates provide a cushioning or shock-absorbing effect.

Chemical foaming agents useful in this invention include hydrazine-based agents or carbonamide compounds. The foaming agent most preferred for the practice of this invention is selected from the class of modified azodicarbonamides. An exemplary group of these compounds is the Celogen family of foaming agents, which are commercially available from Uniroyal Chemical Co. An example of these compounds is Celogen 754A, which is an activated azodicarbonamide having a decomposition temperature range of from about 329° F. to about 356° F. Up to the time of the present invention, this azodicarbonamide has been recommended primarily for use as a chemical foaming agent in polyvinyl chloride (PVC) polymers, and to a lesser extent for low-density polyethylenes (LDPE). Another compound belonging to the same family of foaming agents is Celogen OT, having the chemical designation p,p'-oxybis (benzenesulfonyl hydrazide), and a decomposition temperature range of from about 316° F. to about 320° F. These foaming agents are preferred in the compositions of this invention because of their high activation temperatures. At the higher activation temperatures, the foaming agent will begin to decompose and produce vapor later in the composite-making process as the temperature increases. As a result, most of the decomposition and vapor generation occurs after the matrix resin begins to gel. As a result, the vapor produced on decomposition of the foaming agent is trapped in the resin and not released.

In the compositions of the present invention, the foaming agent is preferably used in an amount ranging from about 0.05% to about 1.0% by weight of the total resin composition. A preferred amount of this ingredient is from about 0.05% to about 0.30% by weight.

The matrix resin for the composite is preferably a polymer selected from the group consisting of polyesters, vinyl esters and epoxy resins. Epoxy resins are favored because they are highly versatile and can be used in a variety of applications. As an added advantage, they exhibit less shrinkage and higher strength and stiffness properties at moderate curing temperatures. They also produce no by-products during the curing process, and therefore provide a further advantage by being environmentally efficient. Epoxies are also highly resistant to corrosion by solvents, alkalis and some acids. Preferred epoxy resins include low viscosity undiluted bisphenol-A resins. Examples of such resins include DER 330, 331, and 332, which are epoxies manufactured commercially by Dow Chemical Co. The resins are preferably used in fluid form as a liquid, dispersion or melt, any of these variations being hereinafter collectively referred to as a "liquid".

In another embodiment, the invention further comprises adding a second resin in particulate form to the fluid matrix resin. It is theorized that this particulate resin provides a shock-absorbing, cushioning effect within the composites, making them more resistant to impact and high loads and also prevents the fibers in the composite from collapsing together. The specific gravity and the particle size of the resin should be sufficient to permit an even dispersion of the particles in the matrix resin, and the particles should neither sink nor float in the mixture. Preferably, the specific gravity of the particulate resin used in this invention should therefore be approximately the same as the specific gravity of the matrix resin. The particle size should range from about 1 to about 5 microns in diameter. The particulate resin used in this invention is preferably selected from thermoplastic polymers. Most preferably, the particulate resin material is nylon-6, which has a particle diameter size of from about 1 to 5 microns. An example of this type of resin is Orgasol 1002, which is a brand of particulate nylon-6 available from ELF Atochem Inc.

The proportions of the fluid resin and the particulate resin components are selected to form a composite in which the particulate resin is effectively dispersed throughout the resin matrix and in the interstitial spaces between the glass fibers. Preferably, the particulate resin material constitutes about 1% to about 10% weight of the total resin material, and, most preferably, is present in an amount of from about 1.5% to about 2.5% weight. Further, the total amount of the resinous components, including the matrix resin material and the particulate resin material, may be from about 30% to about 50% by weight, based on the total weight of the composite. Preferably, the weight of the resin materials is from about 42% to about 46% by weight.

A curing agent or catalyst may also be included in the resin compositions. The curing agent promotes hardening of the thermoset resin during the curing phase. Epoxy resins typically require the addition of a hardener or curing agent to effect cure. Typical curing agents include aromatic or aliphatic amines or acid anhydrides. The preferred hardening agent in this invention is an acid anhydride, an example of which is sold under the brand name Lindride 66K by Lindau Chemical Co. The curing agent is desirably used in amounts ranging from about 13.5% by weight to about 22.5% weight, based on the total weight of the composite.

The respective proportions of the matrix resin, the curing agent and the blowing agent should be such that the combination will afford a sufficient amount of foam generation. The amount of foam generation should not compromise the ability of the matrix resin to integrate with the fiber component, and should not form a composite that requires the manipulation and processing steps necessary for conventional foamed composites. The ratio of the abovementioned components will vary somewhat depending on the amount of activity demonstrated by the foaming agent at typical composite formation temperatures. Generally, however, the amount of foaming agent used is from about 0.05% to about 0.30% by weight. For example, when Celogen 754A is used as the foam generator, the ratio of matrix polymer to curing agent to foaming agent may be from about 100:85:0.05 to about 100:85:0.27. Unlike the composites of this invention, conventional foamed composites undergo significant volume expansion, and are typically utilized in other processes that require lightweight structures. In comparison, using a foaming agent in the composites and the manufacturing processes of this invention, such as filament winding, was not previously known or recognized in the art.

The fiber reinforcing materials that are employed in the composites of this invention are preferably in the form of continuous fibers, strands or rovings. The term "fiber reinforcing material", as it is used here, includes continuous, unbroken single filaments, combinations of filaments in the form of fibers, strands made of untwisted fibers, or rovings of bound fibers.

The fiber reinforcing material used in the practice of this invention can be selected from materials that are well known in the art for manufacturing composite structures. Some examples of these include aramids, graphite, boron, ceramic or glass fibers, and combinations thereof. Glass fibers are preferred. Glass fibers are conventionally manufactured by eluting molten glass through a heating bushing having precisely drilled apertures which allow formation of streams of glass that are then attenuated and wound onto a closet. Optionally, the glass fibers may be sized by applying a sizing composition that has the effect of smoothing the fiber surface and facilitating subsequent surface bonding of additives to the fiber.

The glass fiber may be selected from several types, including S-glass, E-glass, or a carbon-fiber/glass-fiber hybrid. While a carbon/glass hybrid is highly effective for making the composites of this invention, its high cost is often prohibitive. Accordingly, S- or E-glass is generally preferred. For example, S-glass fibers may be used with excellent results. Usually, such fibers will have a tensile strength of about 3970 MPa, and a Young's modulus of about 94 GPa. The glass fiber material component is used in an amount of from about 50% by weight to about 70% by weight, based on the total weight of the composite. Preferably, the amount of the glass fiber material is from about 54% to about 58% by weight.

To prepare the preferred resin compositions containing the highly effective foaming agents of this invention, a desired amount of foaming reagent is added to the resin matrix material with continuous agitation and heating until the reagent appears to be completely dissolved. The mixture is then cooled to room temperature. The curing agent is subsequently added, with further agitation. The combination of resin matrix, foaming agent and curing agent is then heated to initiate the breakdown of the foaming agent and begin gas production. Preferably, gas production begins at 180° C. or higher.

The type of heating source chosen to activate the foaming agent appears to be important to the success of the foaming step. Preferably, a steam heating source is used. Where the composite being made is in the form of pipes or other hollow-shaped articles made by filament winding, a thermal source that provides internal contact with the steam or heat source is desirably used.

Other additives that may optionally be included in the resin matrix composition include impact modifiers, lubricants, mold release agents, pigments and other processing aids.

The resin compositions of the invention are combined with the fibers to form the composites. The compositions of the invention may be used in the manufacture of filament wound composite articles which comprise at least one layer of a resinous matrix material, these layers being embedded with the reinforcing fiber material.

In making filament wound composite pipes, which are a particularly preferred aspect of the invention, fiber materials are coated or impregnated with the resin composition and then cured. The fiber materials, in particular glass fibers, are pulled through a bath containing the resin by a winder apparatus, after which the wet fibers are wound onto rotating mandrels or sleeves to form a pipe. The fibers may be wound over a material designed to form an integral part of the composite structure, such as a heat-shrinkable polyethylene material, which is in direct contact with the sleeve. This material then forms the lower layer of the composite. Alternatively, the fibers may be wound directly onto the mandrel, which functions as a mold or form that is subsequently removed, leaving a freestanding composite article. The direction of the winding can be modified or the rate of winding can be adjusted to obtain a desired winding pattern in layers over the mandrel. The winding action thus forms and compacts the layers of the composite before curing. Curing is accomplished by exposing the composite to a temperature sufficient to cure the resin, typically a temperature in a range of from about 340° C. to about 360° C. In the case of epoxy resins, a lower temperature may first be used to gel the resin, then a higher temperature phase used to finalize the cure.

The novel improvement of including a chemical blowing agent which is capable of entraining a desired volume of vapor within the thermoset resin compositions of this invention has the effect of producing a fiber wound composite of improved strength. Contrary to the prevailing notion in the art, it has now been discovered that articles containing this foamed, filament wound composite demonstrate unexpectedly superior properties such as higher burst strength retention and improved resistance to cyclic fatigue.

The following examples are representative of the disclosed invention.

EXAMPLES

Examples 1–3

For example 1, a resin composition according to this invention was prepared comprising a foaming agent, a resin matrix polymer and a hardener. The matrix polymer was a fluid epoxy resin, DER 331, which is commercially available from Dow Chemical Co. About 1796 grams (52.97% by wt.) of DER 331 was mixed with about 1.7 grams (0.05% by wt.) of Celogen 754A foaming agent, and the mixture was heated until it dissolved In order to achieve complete dispersion, it was necessary to heat the material to up to 130° C., while using high agitation. After cooling to room temperature, about 1526 grams (45.92% by wt.) of Lindride 66K curing agent was added.

For example 2, a resin composition was prepared by first mixing a resin matrix binder with a particulate resin material. DER 331 was used as the matrix resin, in an amount of about 1777 grams (52.97% by weight). To this, about 67.1 grams (2.00% by weight) of the nylon-6 particulate resin, Orgasol 1002, was added while using good agitation to achieve a uniform dispersion. The mixture was heated to about 80° C. to reduce the viscosity of the resin and promote dispersion. High-speed agitation was then applied to de-agglomerate any clumped particles of nylon. In this manner, most of the agglomerated particles were separated into discrete particles and dispersed throughout the matrix. To ascertain the degree of dispersion, a sample of the mixture was examined under a microscope. Discrete particles having a diameter of about 1 micron were observed, as well as small agglomerates having a maximum particle size of about 10 microns. The resin mixture was then cooled to room temperature, after which about 1511 grams (45.03% by weight) of Lindride 66K was added as the curing agent.

Each resin system was evaluated by coating a sample onto 5 ends of sized glass that had been dried in a P871 in-line drying unit without post-drying. The in-line drying unit is of the type characterized in U.S. Pat. No. 5,055,119, which is herein incorporated by reference. The coated fiber lengths were then wound via a threader mechanism onto a mandrel to form a length of pipe. Each of the composite pipes so formed consisted of two layers of the resin-fiber combination, built up using twenty passes from the threader. The pipes were then cured in a steam system at a temperature of about 350° F.

As a comparison, in example 3, the physical characteristics of a previously formed filament wound composite made of a resin composition comprising 54% DER 331 and 46% Lindride 66K were also evaluated against the composites of this invention. This composition differed from the present invention in that it did not contain either a chemical foaming agent or a particulate resin.

As a further comparison, example 4 was prepared using a carbon/E-glass hybrid as the fiber-reinforcing material. The fiber was impregnated with a resin matrix composition including particulate nylon-6 in a proportion similar to that used in Example 2, and wound into a composite in the manner previously described.

The products were evaluated for several physical parameters including wall thickness, glass content, and resin content. The volume of vapor entrained in the composite was also calculated for each sample. The volume calculation was performed using a Quantimet SEM™ photomicrograph analysis to measure the volume of the voids in the hardened composite; or, alternatively, the volume of the voids was determined based on volume fractions.

The results are set out in Table 1 below:

TABLE 1

| Example No. | 1 | 2 | 3 | 4 |
|---|---|---|---|---|
| Fiber/sizing type | (a) | (a) | (b) | (c) |
| Avg. wall thickness (mils) | 47 | 56 | 37 | 58.6 |
| Glass content (% wt.) | 62.97 | 55.44 | 72.37 | |
| Resin content (% wt.) | 37.03 | 44.56 | 27.63 | 43.63 |
| Vapor Volume (calc. %) | 7.60 | 5.35 | 2.53 | 5.00 |

[a] - Zentron 721B AA 750 S-glass strands prepared with a sizing formulation containing A-187, an epoxy silane coupling agent available from OSi, a division of Witco Chemical Co., and 0.1% by weight mono-pentaerythritol (mono-PE). This formulation is disclosed in U.S. Pat. No. 5,262,236 which is hereby incorporated by reference.
[b] - same type of strands as used for (a), wherein the sizing includes A-1120, a diaminosilane, as the coupling agent and excludes mono-PE.
[c] - HERCULES AS4 ™ carbon/E-glass hybrid strands sized with a formulation similar to that used for (a).

As shown by the data, the resin composition composed of the DER-331 epoxy, the Celogen 754A foaming agent and the Lindride 66K hardener increased the wall thickness of the pipe composite from about 37 to about 47 mils. This increased wall thickness is probably due to the increased bulk of the composite because of the presence of voids containing entrained vapor. The volume of entrained vapor was also significantly increased, from about 2.53% to about 7.60% of the volume. When the particulate nylon component was used in the absence of the foaming agent, the pipe-wall thickness increased to approximately 56 mils. This degree of reinforcement thickness is similar to that obtained using carbon/E-glass hybrid.

The calculated vapor volume for the sample composite including the foaming agent closely approximated composites made using carbon/glass fibers as well. Typically, composites including carbon/glass fibers have an air volume of about 4.75%, which is close to the amount of 7.60% that has been discovered for the composites of this invention. These physical properties, which resemble those of composites made using the more expensive carbon/glass fibers, represent unexpected and superior attributes associated with the resin compositions of this invention.

The pipes formed using the resin composition of this invention were opaque in appearance, and apart from a few surface irregularities, had a smooth surface. It is believed that the opaque appearance in those samples made using the chemical foaming agent was due to the presence of entrained vapor.

Examples 5–9

In addition, the type of glass fiber was varied to determine whether the air volume would be affected by the choice of fiber material.

For Examples 5 and 6, two fiber types were used to form filament wound composites, using resin compositions containing the foaming agent as previously described in Example 1. One of the fibers, designated as a "K" fiber, was a 2000-filament strand of 994 S-glass sized using a formulation according to fiber/sizing type (b), as described above in Table 1, and run as a single end. The sizing formulation applied to this strand contained an emulsified, low molecular weight epoxy resin, a diaminosilane and various lubricants. The other fiber, designated a "Z" fiber, comprised a strand of the same S-glass sized with a formulation containing an emulsified low molecular weight epoxy, a blend of methyl silane and amino silane, and various lubricants. As Examples 7–8, wound composite were also prepared using the nylon-containing resin compositions and each type of fiber. Lastly, as Example 9, a blend of the two resins in a 50:50 proportion was used to make a composite pipe using the K fiber. The resin blend for this example contained the epoxy resin, the particulate nylon resin and the foaming agent. The concentrations of the foaming agent and the particulate resin material were halved in this blend.

The performance characteristics of composites prepared using the different fibers are compared in Table 2.

TABLE 2

| Example | 5 | 6 | 7 | 8 | 9 |
|---|---|---|---|---|---|
| Resin Comp. | with foaming agent | | With nylon-6 | | nylon-6 + foaming agent |
| Glass fiber | K | Z | K | Z | K |
| Glass (% wt.) | 61.47 | 65.95 | 56.19 | 58.13 | 58.14 |
| Resin (% wt.) | 38.53 | 34.05 | 43.81 | 41.87 | 41.96 |
| Wall thickness (inches) | .0516 | .0449 | .0577 | .0518 | .0552 |
| Entrained Vapor (% v.) | 9.43 | 9.00 | 8.77 | 3.03 | 8.75 |

From the data, it can be observed that the most dramatic results using the particulate resin-containing composition of this invention were obtained using the K fiber. The composites made using this fiber had higher resin content, thicker walls and more entrained air than those made using the Z fiber. The difference in results may have been due to the greater strand integrity of the K fiber.

Examples 10–13

Properties such as burst strength retention and loss were also evaluated using pipes made with the invention, and compared to pipes made using standard composite formulations. Example 10 was constituted using the same ingredients and proportions as indicated for Example 1, above. The formulation included 54.0% weight DER-331, 45.9% wt. Lindride 66K and 0.10% weight Celogen 754A. Examples 11–13 comprised standard resin formulations using different types of fiber material: a K fiber, as described above; a Zentron 721B AA 750 glass fiber strand (hereinafter referred to as a "B" fiber strand); and a carbon/E-glass hybrid. The resin formulation used in Examples 11–13 was similar to that used in Example 3, and contained only DER 331 and Lindride 66K.

To prepare the pipes, 16-inch lengths of 3.0 inch diameter heat shrinkable polyethylene tubing were placed on a mandrel and heat shrunk with hot air to conform to the surface. The tubing had a nominal thickness of about 0.20 inches prior to heat shrinking. Five ends of sized glass fiber were wound onto the pipes and steam cured as described for examples 1–3 above. The pipes were then tested to determine the load at which initial burst occurred, and the percentage retention and loss were calculated.

The following protocol was used to determine burst strength retention. A nominal burst strength was first determined by bursting a set of uncycled pipe lengths. Another set of pipe lengths was subjected to cyclic pressure testing, in which the pressure within each pipe length was varied from 0–750 psi for 6,000 cycles. The pipes exposed to cyclic pressure were then burst tested. The burst strength loss was determined according to the formula:

$$1.0 - \frac{\text{burst strength cycled}}{\text{burst strength uncycled}} \times 100 = \% \text{ burst strength loss}$$

The percentage burst strength retention was then calculated as:

% burst strength retention=100−% burst strength loss

The results are stated in Table 3.

TABLE 3

| Example | 10 | 11 Standard | 12 Standard | 13 Standard |
|---|---|---|---|---|
| Glass fiber type | K | K | B | Carbon/E-glass |
| Resin Content (% wt) | 37.55 | 36.57 | 33.70 | 43.63 |
| Entrained vapor (% v.) | 8.07 | 7.95 | 1.02 | 5.00 |
| Wall thickness (in.) | .0494 | .0482 | .0414 | .0586 |
| Burst, BI-Initial | 4985 | 4570 | 4877 | 4410 |
| 6000 cycles (0–750) | 4500 | 3960 | 2953 | 4240 |
| % Retention | 90.27 | 86.65 | 60.55 | 96.15 |
| % Loss | 9.73 | 13.35 | 39.45 | 3.85 |

This data shows that modifying the resin composition according to the invention by incorporating a relatively small amount of vapor greatly increased the burst strength retention of the pipes and decreased the bursting loss. The burst strength of filament wound articles made using the foamed resin composition of the invention was improved in comparison to those made using the standard resin formulations, which lack the foaming agent. In fact, the foamed composites showed a burst strength performance that was closer to that of carbon/E-glass hybrids than had previously been obtained.

It is believed that Applicant's invention includes many other embodiments which are not herein described, accordingly this disclosure should not be read as being limited to the foregoing examples or preferred embodiments.

We claim:

1. A process for making, a fiber reinforced composite article, comprising:
   a) dispersing from about 0.05% to about 1.0% by weight of a foaming agent into a matrix resin composition comprising a thermosetting polymer;
   b) contacting the matrix resin composition with a fibrous reinforcing material to facilitate impregnation thereof;
   c) shaping the resin-impregnated fibrous reinforcing material by a filament winding process; and
   d) curing the matrix resin to form a composite.

2. The method of claim 1, wherein incorporating the foaming agent results in an increase in the volume of entrained vapor within the composite of from about 1.0 to about 7.6% by volume.

3. The method of claim 1, wherein the foaming agent has an activation temperature of about 180° C. or higher.

4. The method of claim 1, wherein said blowing or foaming agent is selected from the group consisting of hydrazine based compounds and modified azodicarbonamides.

5. The method of claim 4, wherein said blowing or foaming agent is a modified azodicarbonamide.

6. The method of claim 1, wherein the matrix resin composition further comprises a curing agent.

7. The method of claim 1, wherein the matrix resin composition for making the composites comprises a fluid thermosetting resin and a particulate resin material dispersed within said thermosetting resin.

8. The method of claim 1, wherein the matrix resin composition comprises a polymer selected from the group consisting of polyesters, vinyl esters and epoxy resins.

9. The method of claim 8, wherein the matrix resin composition comprises an epoxy resin.

10. The process of claim 1, wherein the matrix resin composition comprises an epoxy resin.

* * * * *